US012625770B2

(12) United States Patent
Kim et al.

(10) Patent No.: US 12,625,770 B2
(45) Date of Patent: May 12, 2026

(54) DATA STORAGE DEVICE, DATA STORAGE SYSTEM AND COMPUTING SYSTEM FOR SNAPSHOT OPERATIONS

(71) Applicant: SK hynix Inc., Icheon-si (KR)

(72) Inventors: Hyeong Soo Kim, Icheon-si (KR); Dong Kyun Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 84 days.

(21) Appl. No.: 18/421,971

(22) Filed: Jan. 24, 2024

(65) Prior Publication Data

US 2025/0086063 A1     Mar. 13, 2025

(30) Foreign Application Priority Data

Sep. 7, 2023     (KR) ......................... 10-2023-0119178

(51) Int. Cl.
G06F 11/00          (2006.01)
G06F 9/50           (2006.01)
G06F 11/1446        (2026.01)

(52) U.S. Cl.
CPC ........ G06F 11/1451 (2013.01); G06F 9/5016 (2013.01); G06F 11/1469 (2013.01)

(58) Field of Classification Search
CPC ............. G06F 11/1451; G06F 11/1469; G06F 11/1464; G06F 11/1458; G06F 11/1446; G06F 9/5016
See application file for complete search history.

(56) References Cited

U.S. PATENT DOCUMENTS

| 9,794,366 | B1 * | 10/2017 | Pabon | ................... H04L 67/568 |
| 9,830,228 | B1 * | 11/2017 | Chopra | .............. G06F 11/1464 |
| 2016/0124669 | A1 * | 5/2016 | Harris | ................... G06F 3/0673 |
| | | | | 711/162 |
| 2021/0286762 | A1 * | 9/2021 | Benisty | ................... G06F 3/065 |
| 2025/0028611 | A1 * | 1/2025 | Groves | .............. G06F 11/1469 |

FOREIGN PATENT DOCUMENTS

| KR | 20180000606 A | 1/2018 |
| KR | 20220119348 A | 8/2022 |

* cited by examiner

*Primary Examiner* — Marc Duncan
(74) *Attorney, Agent, or Firm* — Perkins Coie LLP

(57) ABSTRACT

In an embodiment of the disclosed technology, a data storage device includes at least one memory device including a plurality of memory regions configured to store data, a first controller configured to allocate the plurality of memory regions according to a memory allocation request of one or more host devices, and a second controller configured to: generate, in response to a snapshot request of a first host device among the one or more host devices, snapshot data corresponding to at least part of the data stored in at least part of the plurality of memory regions allocated to the first host device; and store the snapshot data into an auxiliary storage device coupled to the second controller.

17 Claims, 10 Drawing Sheets

DATA STORAGE DEVICE, DATA STORAGE SYSTEM AND COMPUTING SYSTEM FOR SNAPSHOT OPERATIONS

PRIORITY CLAIM AND CROSS-REFERENCE TO RELATED APPLICATION

This patent document claims the priority and benefits of Korean Patent Application No. 10-2023-0119178 filed on Sep. 7, 2023, which is incorporated herein by reference in its entirety.

TECHNICAL FIELD

Various embodiments of the disclosed technology generally relate to a data storage device, a data storage system and a computing system.

BACKGROUND

A data storage device may include a memory device including a plurality of memory cells. According to a request of a host device, the data storage device may store data in the memory device or may provide data stored in the memory device to the host device.

Each of a plurality of host devices may perform data processing using a data storage device which is separately connected to the host device. Also, each of the plurality of host devices may perform data processing by using, together with the remaining host devices, a data storage device connected to the plurality of host devices.

Since each host device performs data processing using together a data storage device which is separately connected to the host device and a data storage device which is connected to the plurality of host devices, it is possible to improve data processing performance by the host device.

However, in the case of the data storage device which is connected to the plurality of host devices, data transmission and reception speed may be lower compared to a data storage device which is connected to each host device, and since a bandwidth between a host device and the data storage device is limited, limitations may exist in improving data processing performance by the host device.

SUMMARY

The disclosed technology can be implemented in some embodiments to effectively perform a snapshot operation for data stored in a data storage device connected to a plurality of host devices.

In some embodiments, a snapshot operation for data stored in a data storage device used by a plurality of host devices is performed through an auxiliary storage device connected to the data storage device, and is separately performed from a snapshot operation for data stored in a local memory adjacent to a host device, and accordingly, a snapshot operation for data stored in the data storage device is performed while preventing or reducing communication delay between the host device and the data storage device.

In an embodiment, a data storage device may include at least one memory device including a plurality of memory regions configured to store data, a first controller configured to allocate the plurality of memory regions according to a memory allocation request of one or more host devices, and a second controller configured to: generate, in response to a snapshot request of a first host device among the one or more host devices, snapshot data corresponding to at least part of the data stored in at least part of the plurality of memory regions allocated to the first host device; and store the snapshot data into an auxiliary storage device coupled to the second controller.

In an embodiment, a data storage system may include an auxiliary storage device, and a data storage device including a plurality of memory regions configured to store data, and configured to allocate the plurality of memory regions according to a memory allocation request of at least one host device, generate, in response to a snapshot request of the at least one host device, snapshot data corresponding to at least part of the data stored in at least part of the plurality of memory regions allocated to the at least one host device among the plurality of memory regions, and store the snapshot data into the auxiliary storage device.

In an embodiment, a computing system may include at least one host device, and a data storage device including a plurality of memory regions configured to store data, and configured to allocate the plurality of memory regions according to a memory allocation request of the at least one host device, and store, into an auxiliary storage device, in response to a snapshot request of the at least one host device, snapshot data corresponding to at least part of the data stored in a memory region of the plurality of memory regions allocated to a first virtual machine operating in the at least one host device among the plurality of memory regions.

In an embodiment, a data storage device may include: at least one memory device including a plurality of memory regions; a first controller configured to allocate the plurality of memory regions according to a memory allocation request of one or more host devices; and a second controller configured to generate, in response to a snapshot request of a first host device among the one or more host devices, snapshot data for at least a part of memory regions allocated to the first host device, and store the snapshot data in an auxiliary storage device.

In an embodiment, a data storage system may include: an auxiliary storage device; and a data storage device including a plurality of memory regions, and configured to allocate the plurality of memory regions according to a memory allocation request of at least one host device, generate, in response to a snapshot request of the at least one host device, snapshot data of data stored in at least a part of memory regions allocated to the at least one host device among the plurality of memory regions, and store the snapshot data in the auxiliary storage device.

In an embodiment, a data storage system may include: at least one memory device including a plurality of memory regions; a controller connected to one or more host devices, and configured to control the at least one memory device; and an auxiliary storage device configured to store data generated by the controller, wherein the controller allocates the plurality of memory regions in response to a memory allocation request of the one or more host devices, receives a snapshot request from a first host device among the one or more host devices, generates, in response to the snapshot request, snapshot data for at least a part of memory regions allocated to the first host device among the plurality of memory regions, and stores the snapshot data in the auxiliary storage device.

In an embodiment, a computing system may include: at least one host device; and a data storage device including a plurality of memory regions, and configured to allocate the plurality of memory regions according to a memory allocation request of the at least one host device and store, in response to a snapshot request of the at least one host device, snapshot data for data stored in a memory region allocated to a first virtual machine operating in the at least one host device among the plurality of memory regions, in an auxiliary storage device.

In some embodiments of the disclosed technology, it is possible to efficiently manage snapshot data corresponding to data stored in a data storage device coupled to or in communication with a plurality of host devices, and thus the data processing performance by the plurality of host devices using the corresponding data storage device may be improved.

BRIEF DESCRIPTION OF THE DRAWINGS

FIGS. 4 to 9 are diagrams illustrating examples of how snapshot data can be processed by the data storage device based on some embodiments of the disclosed technology.

DETAILED DESCRIPTION

Hereinafter, various embodiments of the present disclosure will be described in detail with reference to accompanying drawings.

Figure 1:
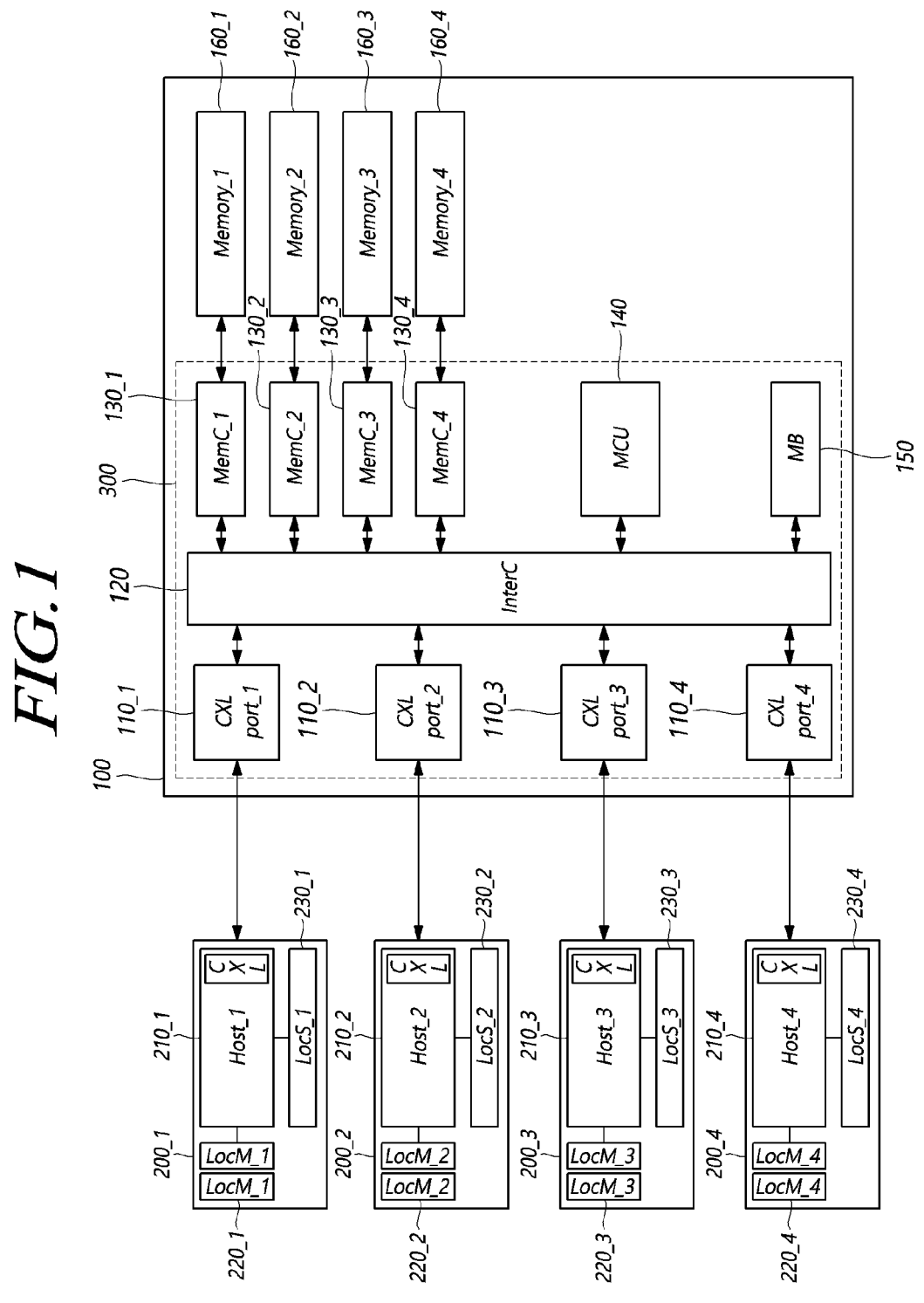
FIG. 1 is a diagram illustrating an example configuration of a data storage device based on an embodiment of the disclosed technology.

FIG. 1 is a diagram illustrating an example of the configuration of a data storage device 100 based on an embodiment of the disclosed technology.

Referring to FIG. 1, the data storage device 100 based on an embodiment of the disclosed technology may include, for example, an interface port 110, an interface controller 120, a memory controller 130, a microcontroller 140, an auxiliary memory 150 and a memory device 160.

The data storage device 100 may include at least one memory device 160. The at least one memory device 160 may be, for example, a volatile memory such as a DRAM, an SDRAM, a DDR SDRAM, an LPDDR SDRAM and a GRAM, but the disclosed technology is not limited thereto. In some implementations, some of the at least one memory device 160 included in the data storage device 100 may be nonvolatile memories.

The example shown in FIG. 1 illustrates a case where the data storage device 100 includes four memory devices 160 such as a first memory device 160_1, a second memory device 160_2, a third memory device 160_3 and a fourth memory device 160_4. The number of memory devices 160 included in the data storage device 100 may various, and an embodiment of the disclosed technology may be applied even when one memory device 160 is included in the data storage device 100.

The data storage device 100 may include at least one memory controller 130 which controls the operation of the at least one memory device 160.

The memory controller 130 may control an operation of writing or erasing data to or in the memory device 160. The memory controller 130 may control an operation of reading data stored in the memory device 160. In some implementations, the memory controller 130 may perform an operation of detecting and correcting an error in the process of reading data stored in the memory device 160.

The memory controller 130 may control the operation of the at least one memory device 160.

FIG. 1 shows an example configuration where each of four memory controllers 130_1, 130_2, 130_3 and 130_4 controls the operation of each of the four memory devices 160_1, 160_2, 160_3 and 160_4.

The data storage device 100 may include the microcontroller 140.

The microcontroller 140 may allocate or deallocate a memory region included in the memory device 160 according to a request of a host system 200. The microcontroller 140 may store allocation information of memory regions included in the memory device 160 in a separate storage space.

As in the example shown in FIG. 1, the microcontroller 140 may be separately disposed from the memory controller 130. In some implementations, at least some of the functions of the microcontroller 140 may be implemented by being integrated with the memory controller 130.

The data storage device 100 may include the auxiliary memory 150.

The auxiliary memory 150 may be, for example, a volatile memory such as an SRAM, but the disclosed technology is not limited thereto.

For example, the auxiliary memory 150 may store a command received from the host system 200 or may temporarily store data necessary for the operation of the microcontroller 140 or the memory controller 130.

The data storage device 100 may include the interface port 110 and the interface controller 120.

The data storage device 100 may communicate with the host system 200 through the interface port 110.

By the interface controller 120, a command transferred from the host system 200 may be transferred to the microcontroller 140 or the memory controller 130. Also, by the interface controller 120, communication may be performed between the microcontroller 140, the memory controller 130 and the auxiliary memory 150.

The above-described interface port 110, interface controller 120, memory controller 130, microcontroller 140 and auxiliary memory 150 may be implemented as a system-on-chip 300 on a single substrate, for example. In this case, the plurality of memory devices 160 may be located outside the system-on-chip 300, and may be electrically connected to the memory controller 130 included in the system-on-chip 300.

In some implementations, at least some of components implementing the system-on-chip 300 may be implemented in the form of a chiplet. For example, the microcontroller 140 and the memory controller 130 may be implemented as separate chiplets. In this case, the memory controller 130 and the memory device 160 may be implemented as one chiplet.

The data storage device 100 may communicate with at least one host system 200 through the interface port 110. For example, the data storage device 100 may include four interface ports 110_1, 110_2, 110_3 and 110_4. The four interface ports 110_1, 110_2, 110_3 and 110_4 may be connected to four host systems 200_1, 200_2, 200_3 and 200_4, respectively.

FIG. 1 shows an example configuration where one data storage device 100 is used by four host systems 200_1, 200_2, 200_3 and 200_4. Although FIG. 1 shows one data storage device used by four host systems by way of example, the disclosed technology is not limited thereto. The host system 200 and the data storage device 100 may be collectively referred to as a computing system.

Each of the host systems 200 may include, for example, a host device 210, a local memory 220 and a local storage device 230.

The host device 210 may perform communication with the data storage device 100 through a preset interface.

For example, the host device 210 may communicate with the data storage device 100 through the Compute Express Link (CXL) interface. Since the host device 210 communicates with the data storage device 100 through the CXL interface, a low-latency high-bandwidth access environment may be implemented in a structure which communicates with the data storage device 100 including the plurality of memory devices 160 each having high capacity.

Describing, as an example, a first host system 200_1 among the plurality of host systems 200, the first host system 200_1 may include a first host device 210_1, a first local memory 220_1 and a first local storage device 230_1.

The first host device 210_1 may be, for example, a processor such as a CPU. The first local memory 220_1 may be, for example, a volatile memory such as a DRAM. The first local storage device 230_1 may be, for example, a nonvolatile memory such as a NAND flash.

The first host device 210_1 may process and store data using the first local memory 220_1 and the first local storage device 230_1 which are located adjacent to the first host device 210_1.

The first host device 210_1 may be allocated and use a memory region of the memory device 160 included in the data storage device 100.

For example, the first host device 210_1 may transmit a request for allocation of a memory region to the data storage device 100.

The microcontroller 140 of the data storage device 100 may allocate at least some of the memory regions included in the plurality of memory devices 160 to the first host device 210_1 according to the allocation request of the first host device 210_1.

The data storage device 100 may allocate some of the memory regions included in any one of the four memory devices 160_1, 160_2, 160_3 and 160_4. For example, some of the memory regions included in the first memory device 160_1 may be allocated to the first host device 210_1.

In some implementations, the data storage device 100 may allocate some of the memory regions included in each of at least two memory devices 160. For example, some of the memory regions included in the first memory device 160_1 and some of the memory regions included in the second memory device 160_2 may be allocated to the first host device 210_1.

In some embodiments of the disclosed technology, as a memory region of the memory device 160 included in the data storage device 100, a memory region allocated to the first host device 210_1 may be referred to as a first memory region.

The first host device 210_1 may perform data processing using the first local memory 220_1 and the first memory region allocated from the data storage device 100.

While performing data processing using the first memory region, the first host device 210_1 may perform a backup or a snapshot operation for data stored in the first memory region. In some implementations, the term "backup operation" may be used to indicate an operation for copying data from the first memory region to another storage region. By performing the backup operation, all data related to the first host device 210_1 may be stored in another storage region. In some implementations, a snapshot of a file system can be taken at a specific time to restore the entire data corresponding to the file system in the event of data loss or corruption. In some implementations, the term "snapshot operation" may be used to indicate an operation for preserving all files and data configuring a virtual machine operating in the first host device 210_1 at a time point at which the snapshot operation is performed. In an example, at the time point at which the snapshot operation is performed, the virtual machine's status information, memory values, metadata and all data configuring the virtual machine that are stored in a storage region may be stored in or copied to another storage region. When the snapshot operation is performed, all data related to the corresponding virtual machine at the time point at which the snapshot operation is performed may be stored in another storage region, and in some embodiments of the disclosed technology, such data may be referred to as snapshot data. In some implementations, the term "snapshot data" may be used to indicate all the data required to restore the virtual machine to the time point when the snapshot operation is performed.

For example, the first host device 210_1 may back up data stored in the first memory region to the first local storage device 230_1 which is adjacent to the first host device 210_1. For another example, the first host device 210_1 may store snapshot data corresponding to the original data stored in the first memory region in the first local storage device 230_1.

The snapshot data may be used to restore the original data stored in the first memory region when necessary.

The first host device 210_1 may back up the data of the first memory region, and may store snapshot data with a smaller capacity than the data in the first local storage device 230_1. By using the snapshot data, the first host device 210_1 may perform a rollback operation to restore the data of the first memory region when necessary. In some implementations, a rollback operation is a process that returns a database to a previous state.

In this way, by storing the snapshot data of the data stored in the first memory region in the first local storage device 230_1, the first host device 210_1 may perform a snapshot operation for the data storage device 100.

The first host device 210_1 may also store snapshot data of data stored in the first local memory 220_1 in the first local storage device 230_1. The first host device 210_1 may perform a snapshot operation (or a backup operation) for data stored in the first local memory 220_1 and data stored in the first memory region of the data storage device 100, by using the first local storage device 230_1, and may perform a rollback when necessary.

Data distributed in the first local memory 220_1 and the first memory region of the data storage device 100 may be integratedly managed using the first local storage device 230_1 which is adjacent to the first host device 210_1.

In some implementation, a snapshot operation (or backup operation) for data stored in the first memory region of the data storage device 100, which is allocated to the first host device 210_1, may be performed inside the data storage device 100.

In some embodiments of the disclosed technology, a snapshot operation (or backup operation) for data stored in the first memory region may be performed without using the first local storage device 230_1 which is included in the first host system 200_1.

Figure 2:
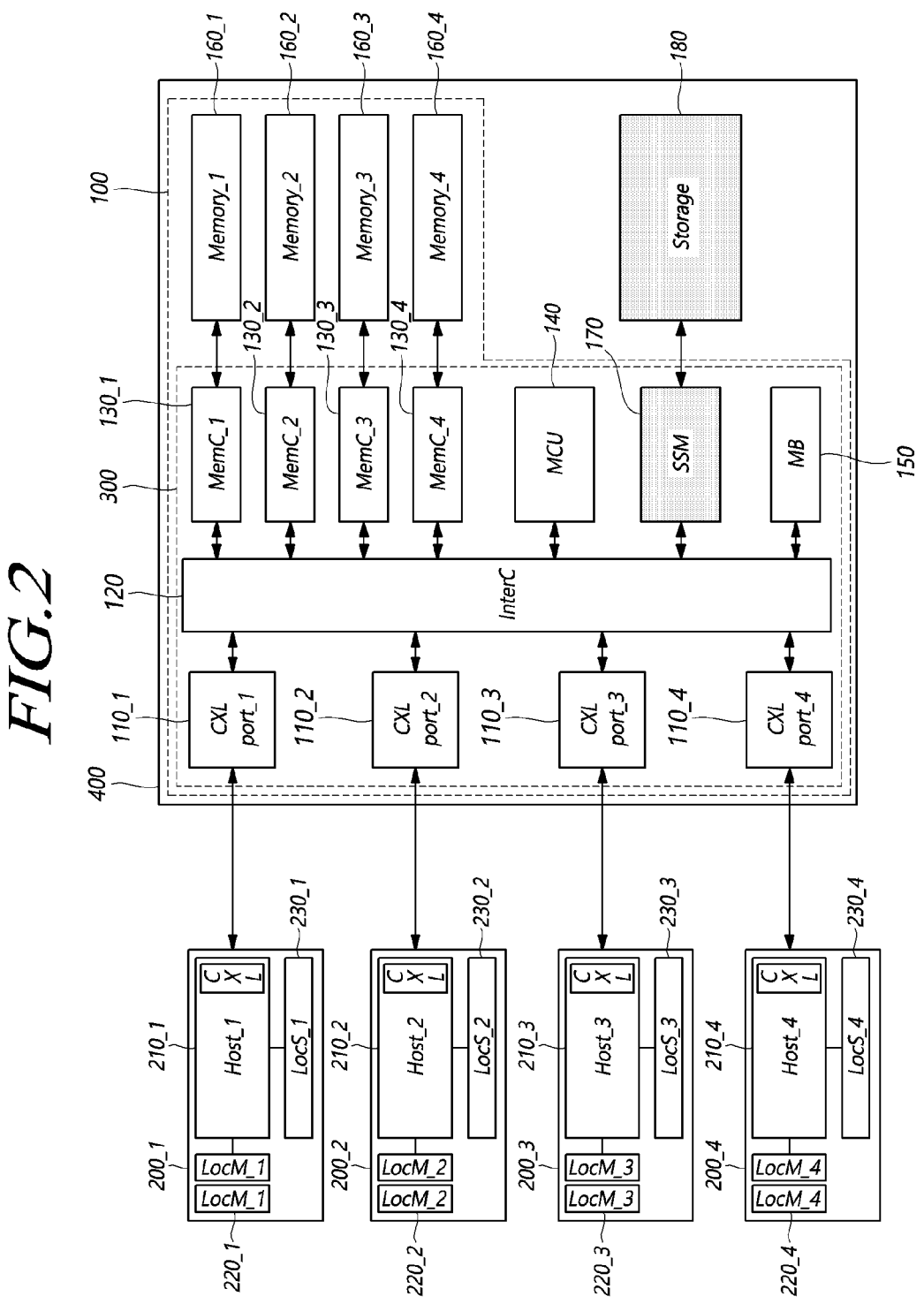
FIG. 2 is a diagram illustrating an example configuration of a data storage device based on an embodiment of the disclosed technology.
Figure 3:
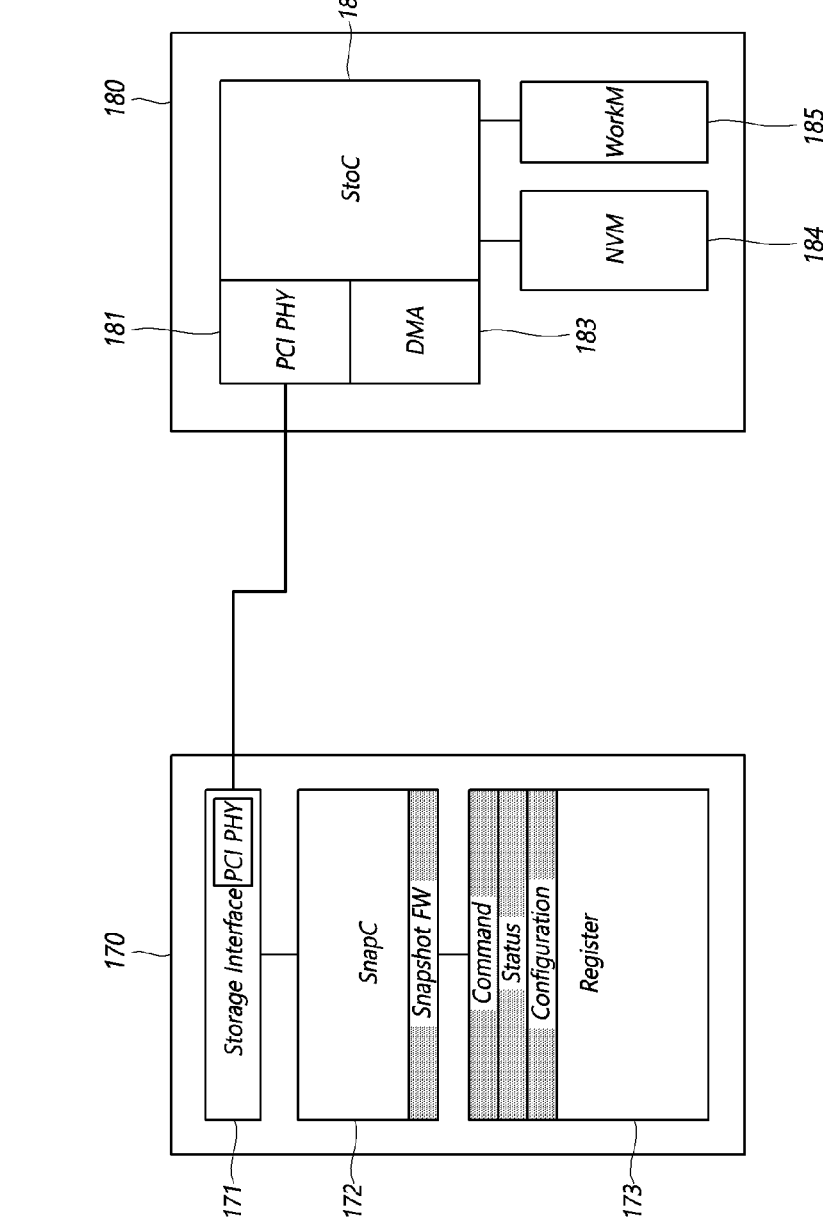
FIG. 3 is a diagram illustrating an example configuration of a snapshot management module and an auxiliary storage device included in the data storage device based on an embodiment of the disclosed technology.

FIG. 2 is a diagram illustrating an example configuration of a data storage device 100 based on an embodiment of the disclosed technology. FIG. 3 is a diagram illustrating an example configuration of a snapshot management module 170 and an auxiliary storage device 180 included in the data storage device 100 based on an embodiment of the disclosed technology.

Referring to FIG. 2, the data storage device 100 based on an embodiment of the disclosed technology may include, for example, an interface port 110, an interface controller 120, a memory controller 130, a microcontroller 140, an auxiliary memory 150, a memory device 160 and the snapshot management module 170.

The data storage device 100 may further include, for example, the auxiliary storage device 180.

In some implementations, the auxiliary storage device 180 may be located outside the data storage device 100. In this case, the data storage device 100 and the auxiliary storage device 180 may be collectively referred to as a data storage system 400.

The auxiliary storage device 180 may be located inside or outside the data storage device 100. In some embodiments of the disclosed technology, the auxiliary storage device 180 is in communication with the host device 210, but is not directly connected to the host device 210. For example, the auxiliary storage device 180 is in the data storage system 400, which is in communication with the host device 210, and thus is not directly connected to the host device 210.

The features of some components of the data storage device 100 shown in FIG. 2 are similar to the components of the data storage device 100 shown in FIG. 1.

The data storage device 100 may include the snapshot management module 170. The snapshot management module 170 may be disposed in a system-on-chip 300. In some implementations, the snapshot management module 170 may be implemented as a separate chiplet. In some implementations, the snapshot management module 170 may be coupled to the auxiliary storage device 180 to perform a snapshot operation by storing, into the auxiliary storage device 180, snapshot data corresponding to data stored in data storage device 100.

In some implementations, the snapshot management module 170 may be disposed separately from the microcontroller 140. In some implementations, at least some components or functions of the snapshot management module 170 may be integrated with the microcontroller 140. In some implementations, at least some components or functions of the snapshot management module 170 may be integrated with the auxiliary storage device 180.

Referring to FIG. 3, the snapshot management module 170 may include, for example, a storage interface 171, a snapshot controller 172 and a register 173.

The auxiliary storage device 180 may include, for example, an interface layer 181, an auxiliary storage controller 182, a data movement management module 183, an auxiliary storage memory 184 and a working memory 185.

The snapshot management module 170 may communicate with the interface layer 181 of the auxiliary storage device 180 through the storage interface 171. The snapshot management module 170 may communicate with the auxiliary storage device 180 through a preset interface. For example, the snapshot management module 170 may communicate with the auxiliary storage device 180 through the PCIe interface, but the disclosed technology is not limited thereto.

In this case, an interface through which the data storage device 100 communicates with a host device 210 and an interface through which the snapshot management module 170 communicates with the auxiliary storage device 180 may be different from each other.

For example, the data storage device 100 may communicate with the host device 210 through a first interface, and the snapshot management module 170 may communicate with the auxiliary storage device 180 through a second interface which is different from the first interface. The first interface may be, for example, the CXL interface described above, and the second interface may be the PCIe interface.

The snapshot controller 172 may perform a snapshot for data stored in the memory device 160 of the data storage device 100 according to a snapshot request.

The snapshot controller 172 may be implemented separately from the microcontroller 140 which is included in the data storage device 100. In some embodiments of the disclosed technology, the microcontroller 140 may be referred to as a first controller, and the snapshot controller 172 may be referred to as a second controller.

In some implementations, all or some functions of the snapshot controller 172 may be integrated with the microcontroller 140.

The snapshot controller 172 may perform snapshot firmware operations according to a snapshot request. In some implementations, the snapshot controller 172 may take a snapshot of data stored in the memory device 160 of the data storage device 100 by performing a snapshot operation according to the snapshot request.

The register 173 may store a command, a status and setting information necessary for performing the snapshot operation.

When the snapshot operation of the data stored in the memory device 160 of the data storage device 100 is performed by the snapshot management module 170, snapshot data may be stored in the auxiliary storage device 180.

The auxiliary storage controller 182 included in the auxiliary storage device 180 may control the operation of the auxiliary storage memory 184 according to a command received from the outside. In some implementations, the auxiliary storage controller 182 may control the operation of the auxiliary storage memory 184 according to its own command.

The auxiliary storage memory 184 may be a nonvolatile memory, but the disclosed technology is not limited thereto. The working memory 185 may be a volatile memory.

The auxiliary storage controller 182 may control the operation of the auxiliary storage memory 184 while storing data required for an operation in the working memory 185.

The auxiliary storage controller 182 may store snapshot data of data stored in the memory device 160 of the data storage device 100 in the auxiliary storage memory 184 according to a command of the snapshot controller 172.

In some implementations, an operation for storing snapshot data in the auxiliary storage memory 184 may be performed by the data movement management module 183 included in the auxiliary storage device 180.

The data movement management module 183 may be, for example, a direct memory access control module DMA.

The data movement management module 183 may store snapshot data of data stored in the memory device 160 of the data storage device 100 in the auxiliary storage memory 184 according to a command of the snapshot controller 172 or the auxiliary storage controller 182.

In this way, a snapshot operation for data stored in the memory device 160 of the data storage device 100 used by a plurality of host systems 200 may be performed separately from a snapshot operation for data stored in a local memory 220 included in each of the plurality of host systems 200.

Since snapshot data of data stored in the memory device 160 of the data storage device 100 is stored in the auxiliary storage device 180 by the snapshot management module 170, a communication or data traffic (transmission and reception of data, etc.) between the host device 210 and the data storage device 100 may not be influenced by a communication or data traffic resulting from a snapshot operation.

Also, since the movement of data resulting from a snapshot operation is controlled by the data movement management module 183 included in the auxiliary storage device 180, the data load of the snapshot management module 170 resulting from the snapshot operation may be reduced.

FIGS. 4 to 9 are diagrams illustrating specific examples of ways in which the data storage device 100 based on an embodiment of the disclosed technology processes snapshot data.

In FIGS. 4 to 9, in order to explain ways in which snapshot data is processed, some of the components included in the host system 200, the data storage device 100 and the auxiliary storage device 180 are illustrated. FIGS. 4 to 9 show example configurations where a snapshot operation is performed while a first host system 200_1 among the plurality of host systems 200 performs data processing using the data storage device 100.

Figure 4:
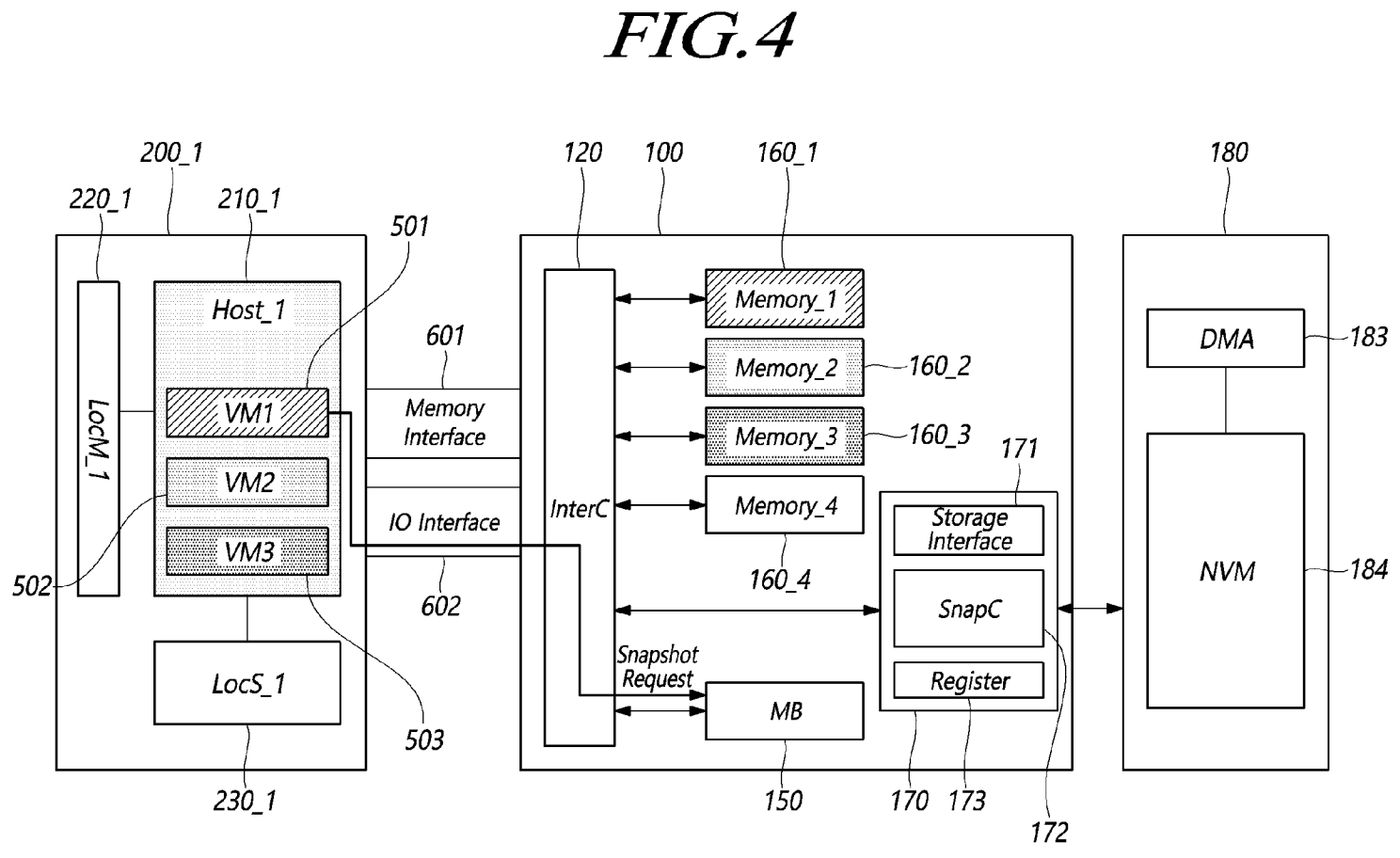

Referring to FIG. 4, the first host system 200_1 may include a first host device 210_1, a first local memory 220_1 and a first local storage device 230_1.

For example, the first host device 210_1 may drive at least one virtual machine and perform a work according to the virtual machine. FIG. 4 shows an example configuration where the first host device 210_1 performs operations associated with a first virtual machine 501, a second virtual machine 502 and a third virtual machine 503.

The first host device 210_1 may be allocated a memory region required to perform operations associated with a virtual machine.

For example, the first host device 210_1 may perform operations associated with a virtual machine by being allocated to a memory region included in the first local memory 220_1.

In addition, the first host device 210_1 may perform operations associated with a virtual machine by being allocated to a memory region of the memory device 160 included in the data storage device 100.

FIG. 4 shows an example configuration where the data storage device 100 includes a first memory device 160_1, a second memory device 160_2, a third memory device 160_3 and a fourth memory device 160_4.

According to an allocation request of the first host device 210_1, a memory region of the memory device 160 included in the data storage device 100 may be allocated to the first host device 210_1. Although not shown in FIG. 4, allocation and deallocation of memory regions may be controlled by the microcontroller 140 included in the data storage device 100.

FIG. 4 shows an example where the memory region of the first memory device 160_1 of the data storage device 100 is allocated to the first virtual machine 501, the memory region of the second memory device 160_2 is allocated to the second virtual machine 502, and the memory region of the third memory device 160_3 is allocated to the third virtual machine 503. In some implementations, a part of the memory region of the first memory device 160_1 may be allocated to the first virtual machine 501, and another part of the memory region of the first memory device 160_1 may be allocated to the second virtual machine 502.

In an example where the first memory device 160_1, the second memory device 160_2 and the third memory device 160_3 are allocated to the first virtual machine 501, the second virtual machine 502 and the third virtual machine 503, respectively, a snapshot request by the first virtual machine 501 may be generated.

The first host device 210_1 may transmit the snapshot request for data stored in the memory region allocated to the first virtual machine 501 to the data storage device 100.

The first host device 210_1 and the data storage device 100 may communicate with each other through, for example, the CXL interface described above.

The first host device 210_1 and the data storage device 100 may transmit and receive data through, for example, a memory interface 601. The first host device 210_1 and the data storage device 100 may transmit and receive a command or a response signal through an input/output interface 602.

The memory interface 601 is different from the input/output interface 602 in terms of their protocols, and data according to the memory interface 601 and a command according to the input/output interface 602 may be transmitted and received using the same bandwidth.

The snapshot request by the first host device 210_1 may be transmitted to the data storage device 100 through the input/output interface 602.

The snapshot request transmitted through the input/output interface 602 may be stored in the auxiliary memory 150. An allocation request, a snapshot request, etc. transmitted by the first host device 210_1 may be stored in the auxiliary memory 150. The auxiliary memory 150 may be referred to as a mailbox.

The snapshot management module 170 may check the snapshot request stored in the auxiliary memory 150 and perform a snapshot according to the snapshot request.

Figure 5:
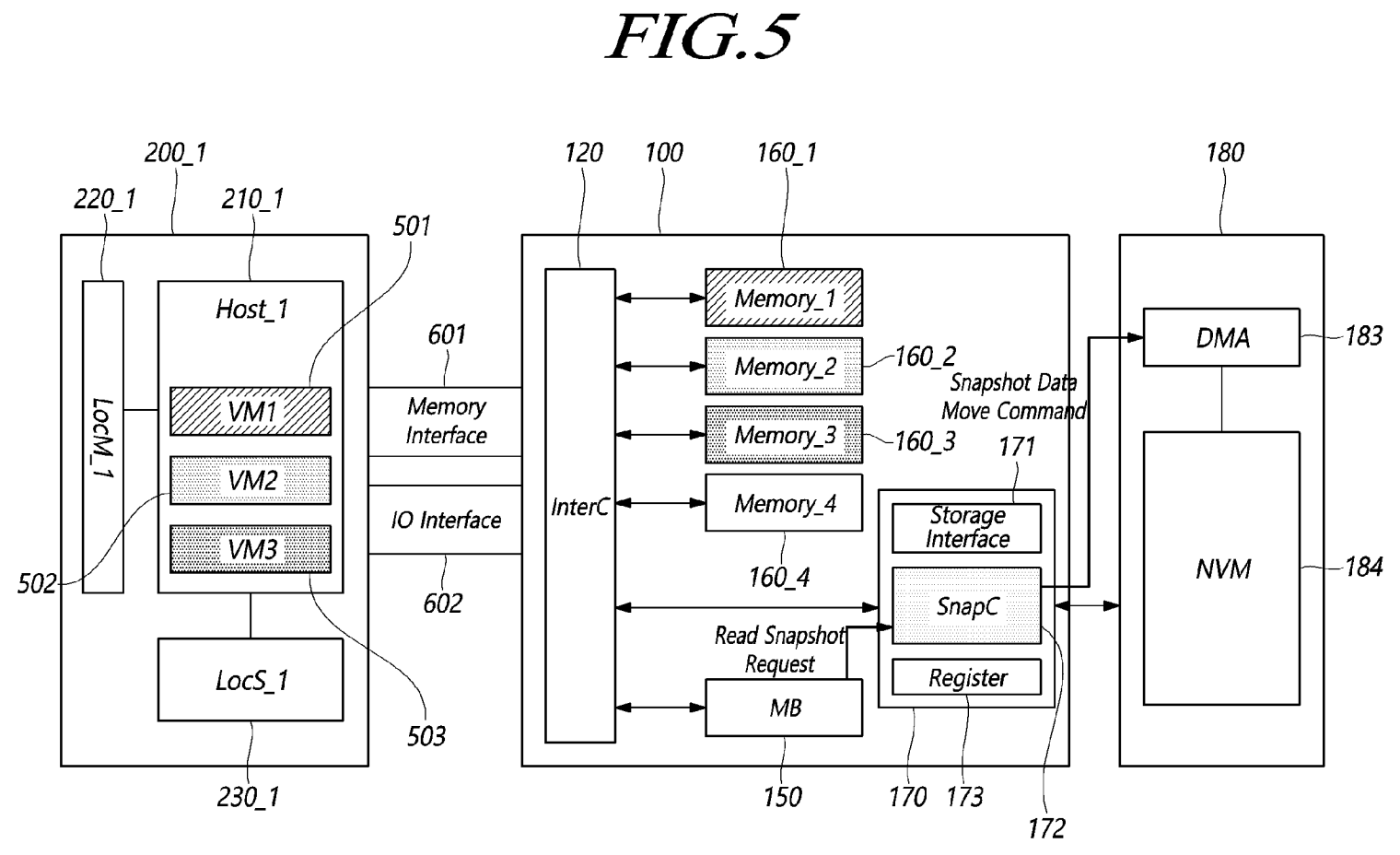

For example, referring to FIG. 5, the snapshot controller 172 included in the snapshot management module 170 may check the snapshot request stored in the auxiliary memory 150. The snapshot controller 172 may check a memory region for which the snapshot according to the snapshot request is required.

In the case of the snapshot request by the first virtual machine 501 operating in the first host device 210_1, the snapshot request may be a command that requests a snapshot for the memory region included in the first memory device 160_1 allocated to the first virtual machine 501.

The snapshot controller 172 may transmit, to the auxiliary storage device 180, a command for requesting a snapshot operation for data stored in the memory region allocated to the first virtual machine 501.

For example, the snapshot controller 172 may transmit information on the address and size of the memory region targeted by the snapshot operation, to the auxiliary storage device 180. The snapshot controller 172 may transmit, to the auxiliary storage device 180, data and information required to restore data that was stored in the corresponding memory region to configure the first virtual machine 501 as if it is at a time point at which the snapshot operation is performed.

The snapshot controller 172 may transmit a command requesting for the movement of snapshot data to the auxiliary storage controller 182 of the auxiliary storage device 180. In some implementations, the snapshot controller 172 may transmit a command requesting movement of snapshot data to the data movement management module 183 of the auxiliary storage device 180.

The snapshot data may be moved to the auxiliary storage device 180 by the data movement management module 183 included in the auxiliary storage device 180.

Figure 6:
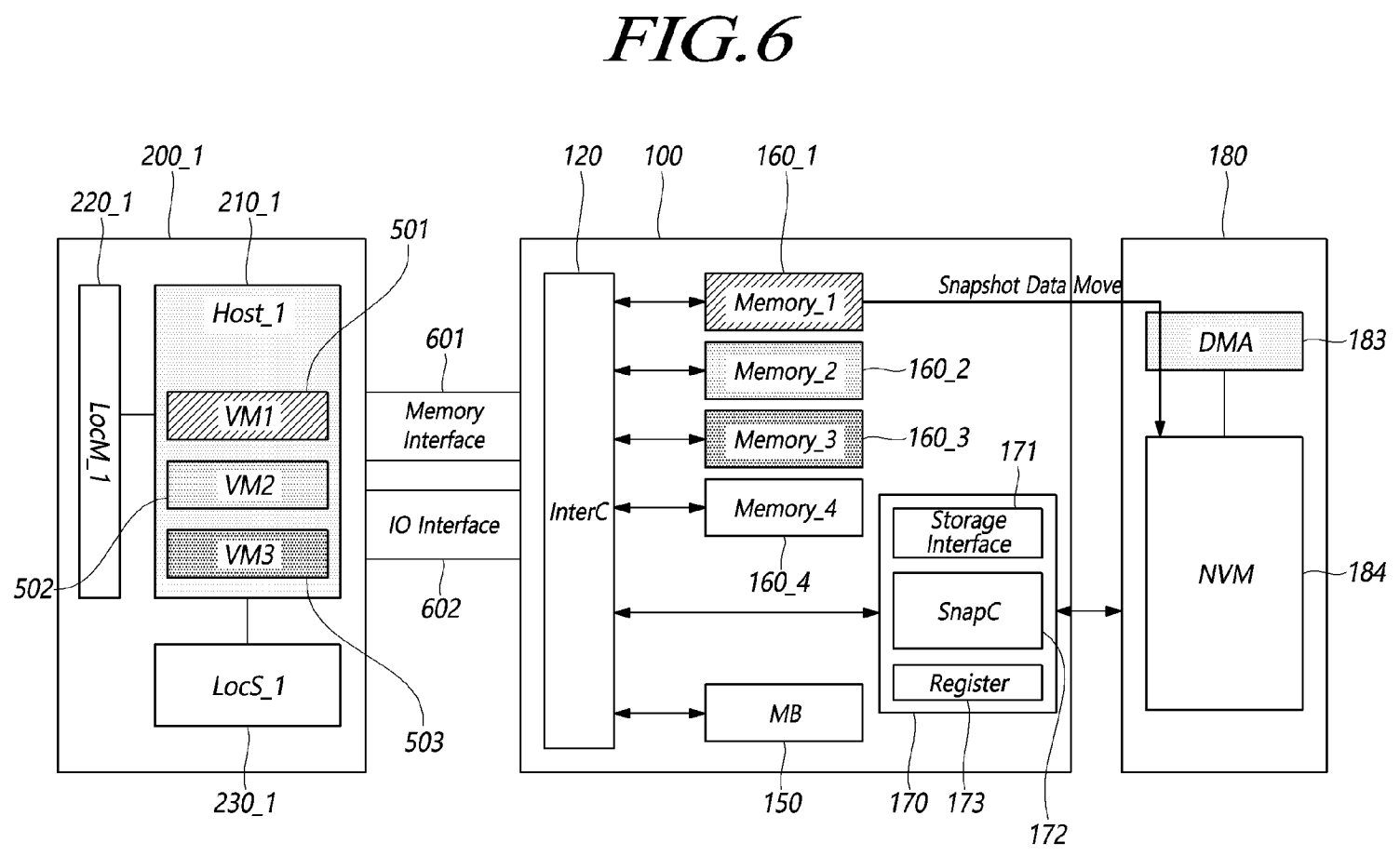

For example, referring to FIG. 6, the data movement management module 183 of the auxiliary storage device 180 may store, into the auxiliary storage device 180, the snapshot data of the data of the memory region according to the movement command received from the snapshot controller 172.

The data movement management module 183 may store the snapshot data for entire or partial data of the memory region allocated to the first virtual machine 510 in the first memory device 160_1, into the auxiliary storage memory 184 of the auxiliary store device 180.

The data movement of the snapshot data according to the snapshot request of the first host device 210_1 may be performed by the data movement management module 183. Since the data movement of the snapshot data is performed by the data movement management module 183, the data load of the snapshot controller 172 may be reduced.

Since the snapshot data of the data of the first memory device 160_1 is moved to the auxiliary storage memory 184 of the auxiliary storage device 180 by the data movement management module 183, when performing the snapshot operation, a bandwidth between the first host device 210_1 and the data storage device 100 may not be used.

When performing the snapshot operation, the bandwidth between the first host device 210_1 and the data storage device 100 may not be affected, and communication performance of the first host device 210_1 and the data storage device 100 may be improved.

Figure 7:
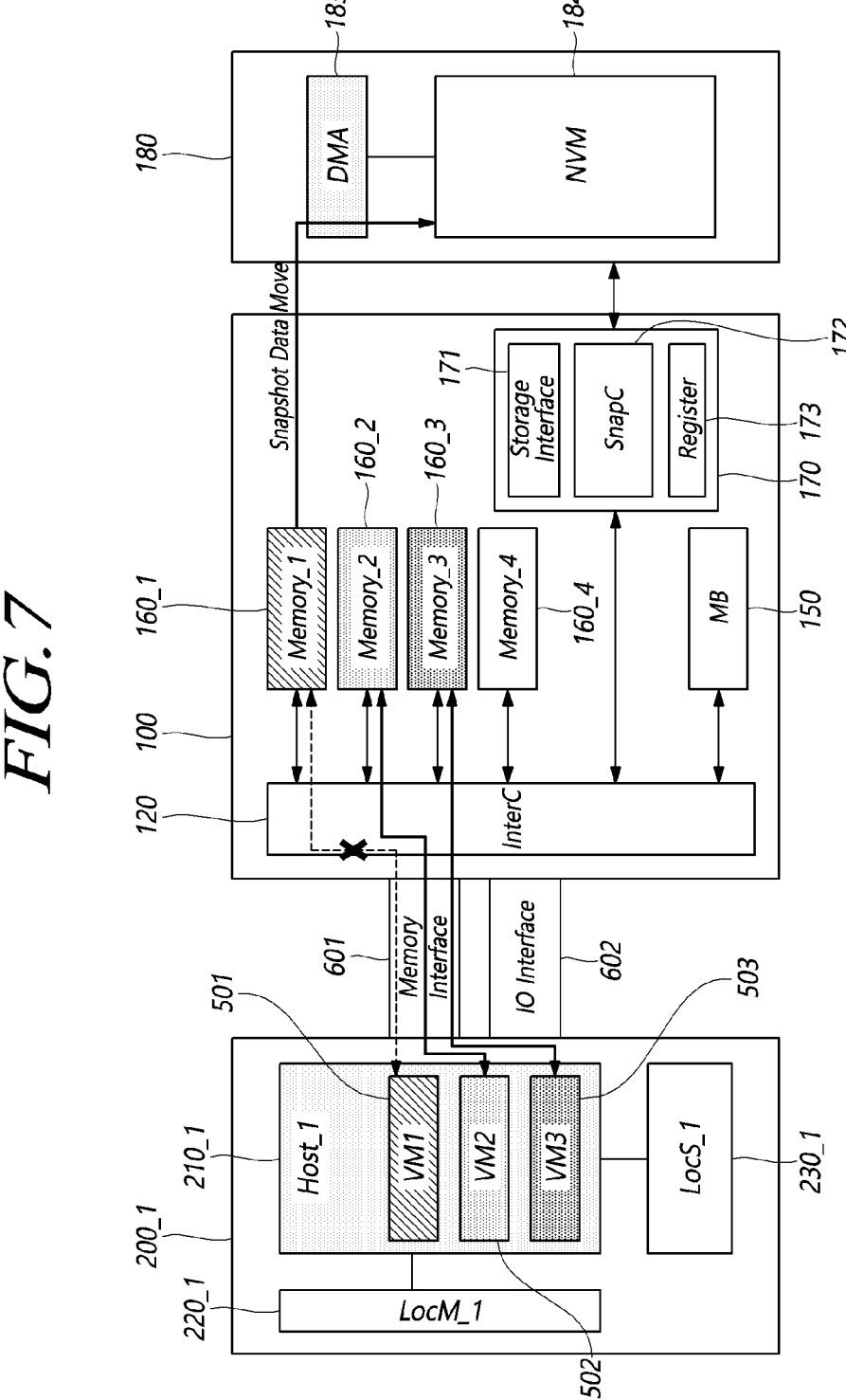

For example, referring to FIG. 7, during a snapshot period (snapshot operation period) in which a snapshot operation is performed according to a snapshot request by the first virtual machine 501, snapshot data corresponding to data stored in the first memory device 160_1 allocated to the first virtual machine 501 may be moved to the auxiliary storage memory 184 by the data movement management module 183 included in the auxiliary storage device 180.

The snapshot data may not be moved between the first host device 210_1 and the data storage device 100.

During the snapshot operation period, the operation of the first virtual machine 501 which has requested for the snapshot operation may be stopped. During the snapshot operation period, data transmission and reception between the first host device 210_1 and the data storage device 100 by the first virtual machine 501 may be stopped.

During the snapshot operation period, data transmission and reception by the second virtual machine 502 and the third virtual machine 503 operating in the first host device 210_1 may be performed. Data associated with the operation of the second virtual machine 502 or data associated with the operation of the third virtual machine 503 may be transmitted and received through the memory interface 601.

Since the snapshot data or data associated with the operation of the first virtual machine 501 performing the snapshot operation is not transmitted or received through the memory interface 601, the bandwidth of the memory interface 601, which may be used by the second virtual machine 502 and the third virtual machine 503 operating in the first host device 210_1 in the same manner as the first virtual machine 501, may increase.

Since a snapshot operation for data stored in the data storage device 100 can be performed by the auxiliary storage device 180 connected to, or in communication with, the data storage device 100, a communication delay between the first host device 210_1 and the data storage device 100 may be reduced or prevented, and the operational performance of a virtual machine operating in the first host device 210_1 may be improved.

A backup operation for data stored in the data storage device 100 may also be performed in a manner similar to the snapshot operation described above.

For example, a backup request by the first host device 210_1 may be stored in the auxiliary memory 150 of the data storage device 100.

According to the backup request stored in the auxiliary memory 150, the snapshot controller 172 of the snapshot management module 170 may transmit a command which instructs to copy data of a corresponding memory region to the auxiliary storage device 180, to the auxiliary storage device 180.

According to the command received from the snapshot controller 172, the data movement management module 183 of the auxiliary storage device 180 may perform a backup operation by copying the data of the corresponding memory region to the auxiliary storage memory 184.

Since the backup operation of the data stored in the memory device 160 of the data storage device 100 is performed through the auxiliary storage device 180 connected to the data storage device 100, it is possible to prevent or reduce occurrence of a communication delay between the first host device 210_1 and the data storage device 100 or a degradation in data processing performance by another virtual machine during a backup operation period.

During a period in which a snapshot operation or a backup operation using the auxiliary storage device 180 is performed in the data storage device 100, a snapshot operation or a backup operation of data stored in the first local memory 220_1 of the first host device 210_1 may be performed.

Figure 8:
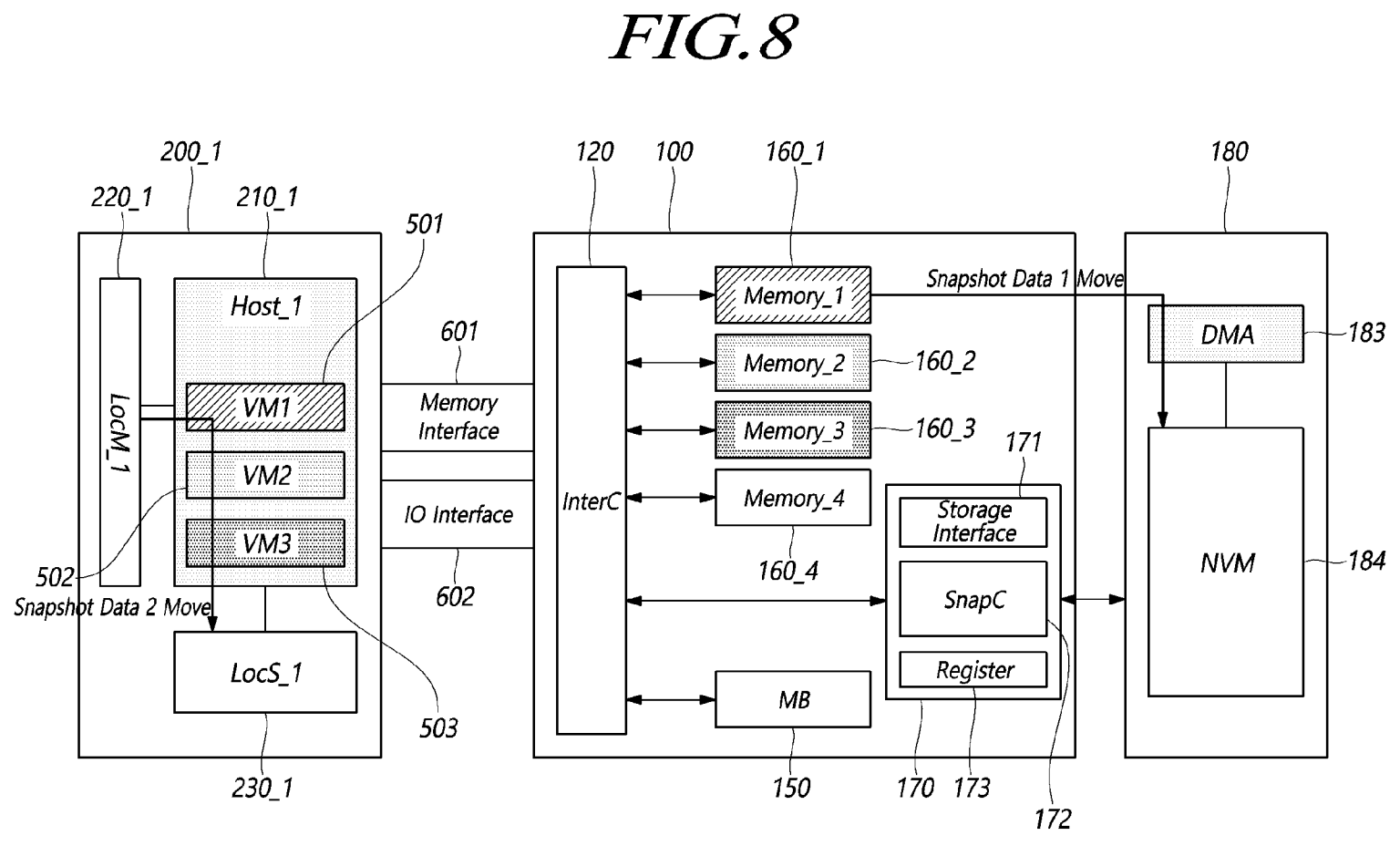

For example, referring to FIG. 8, according to a snapshot data movement command according to a snapshot request of the snapshot controller 172, the data movement management module 183 may store snapshot data of data stored in the first memory device 160_1 in the auxiliary storage memory 184.

When snapshot data of data stored in a memory region of the first memory device 160_1 allocated to the first virtual machine 501 is referred to as first snapshot data, the first snapshot data may be stored in the auxiliary storage memory 184 of the auxiliary storage device 180 during a snapshot period.

A snapshot operation may be performed in the first host device 210_1 during the period in which the first snapshot data is stored in the auxiliary storage memory 184.

Snapshot data of data stored in the memory region of the first local memory 220_1 allocated to the first virtual machine 501 operating in the first host device 210_1 may be stored in the first local storage device 230_1.

The snapshot data of the data stored in the memory region of the first local memory 220_1 allocated to the first virtual machine 501 may be referred to as second snapshot data or additional snapshot data. The second snapshot data may be stored in the first local storage device 230_1 which is adjacent to the first host device 210_1, during the snapshot operation period.

At least a portion of a period in which the second snapshot data is stored in the first local storage device 230_1 may overlap with a period in which the first snapshot data is stored in the auxiliary storage memory 184 of the auxiliary storage device 180.

During the snapshot operation period, data according to the operation of the first virtual machine 501 and data according to a snapshot operation may not be transmitted and received through the memory interface 601.

A snapshot operation for data stored in the first local memory 220_1 may be performed inside the first host system 200_1.

A snapshot operation for data stored in the memory device 160 of the data storage device 100 may be performed in the data storage system 400 including the data storage device 100 and the auxiliary storage device 180.

In some embodiments of the disclosed technology, without transmission and reception of data between the first host device 210_1 and the data storage device 100, a snapshot operation for data stored in a memory region allocated to the first virtual machine 501 operating in the first host device 210_1 may be performed. In some implementations, a backup operation for data stored in a memory region allocated to the first virtual machine 501 may be similarly performed.

A snapshot operation or a backup operation for data stored in the memory device 160 of the data storage device 100 may be performed while preventing or reducing a communication delay between the first host device 210_1 and the data storage device 100.

In some implementations, a snapshot operation for data stored in the first local memory 220_1 adjacent to the first host device 210_1 may be performed through the data storage device 100.

Figure 9:
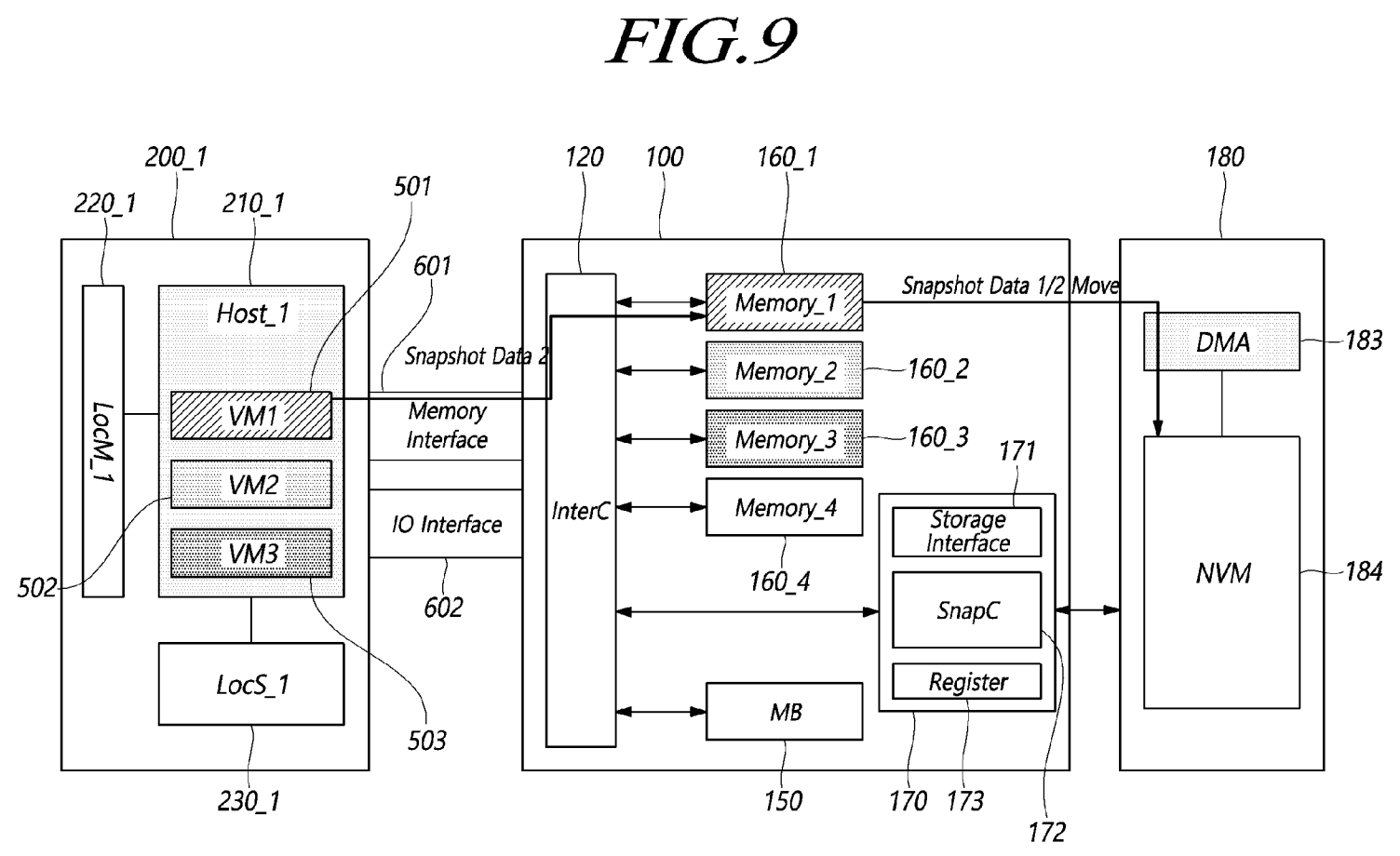

For example, referring to FIG. 9, second snapshot data for data stored in the first local memory 220_1 allocated to the first virtual machine 501 operating in the first host device 210_1 may be transmitted to the data storage device 100.

The second snapshot data may be stored in a memory region allocated to the first virtual machine 501 among the memory regions of the memory device 160 included in the data storage device 100. For example, the second snapshot data may be stored in the memory region of the first memory device 160_1.

The second snapshot data may be transmitted, for example, before a snapshot request by the first host device 210_1 is transmitted to the data storage device 100.

According to the snapshot request, the snapshot controller 172 of the data storage device 100 may perform a snapshot operation for data stored in the memory region of the first memory device 160_1.

The snapshot controller 172 may store first snapshot data for data stored in the memory region of the first memory device 160_1 and the second snapshot data received from the first host device 210_1, into the auxiliary storage memory 184 of the auxiliary storage device 180. Data may be moved by the data movement management module 183 included in the auxiliary storage device 180.

In some implementations, the second snapshot data transmitted by the first host device 210_1 may be directly stored in the auxiliary storage memory 184 by the snapshot controller 172 and the data movement management module 183.

In this case, the second snapshot data may be transmitted to the data storage device 100 before or after the snapshot request by the first host device 210_1 is transmitted.

Since both the second snapshot data of data stored in the first local memory 220_1 and the first snapshot data of data stored in the first memory device 160_1 of the data storage device 100 are stored in the auxiliary storage memory 184 of the auxiliary storage device 180, management of snapshot data may be collectively performed.

In some implementations, when the size of the first snapshot data is smaller than the size of the second snapshot data, a snapshot may be performed as the first snapshot data is moved to the first local memory 220_1.

By moving data whose size is smaller, between the first snapshot data and the second snapshot data, snapshot data may be collectively managed in one device. While reducing use of bandwidth between the first host device 210_1 and the data storage device 100, collective management of snapshot data may be possible.

Similarly, when a backup operation of data used by the same virtual machine in the first host device 210_1 and the data storage device 100 is performed, such a backup operation may be separately performed in each of the first host device 210_1 and the data storage device 100.

Furthermore, depending on the size of data, data of any one side may be moved to the other side, and a backup may be collectively performed in one device.

While efficiently using the bandwidth between the first host device 210_1 and the data storage device 100, collective management of data may be performed.

In this way, snapshot data or backup data may be managed, and a data restoration based on the corresponding data may be performed when necessary.

For example, when a rollback request of the first host device 210_1 is generated, the snapshot controller 172 may restore snapshot data stored in the auxiliary storage memory 184 of the auxiliary storage device 180 to the memory region of the first memory device 160_1.

Data restoration by the snapshot data may be performed, and in this case, the snapshot controller 172 may restore the snapshot data stored in the auxiliary storage memory 184 to the memory region of the first memory device 160_1, through an internal data movement management module located inside the data storage device 100. The internal data movement management module may be a separate module from the data movement management module 183 included in the auxiliary storage device 180, and for example, may be a module that controls data movement between memory devices 160 inside the data storage device 100.

Snapshot data or backup data may be restored by the snapshot controller 172 in the data storage device 100, and restoration in the first host device 210_1 may be separately performed.

Figure 10:
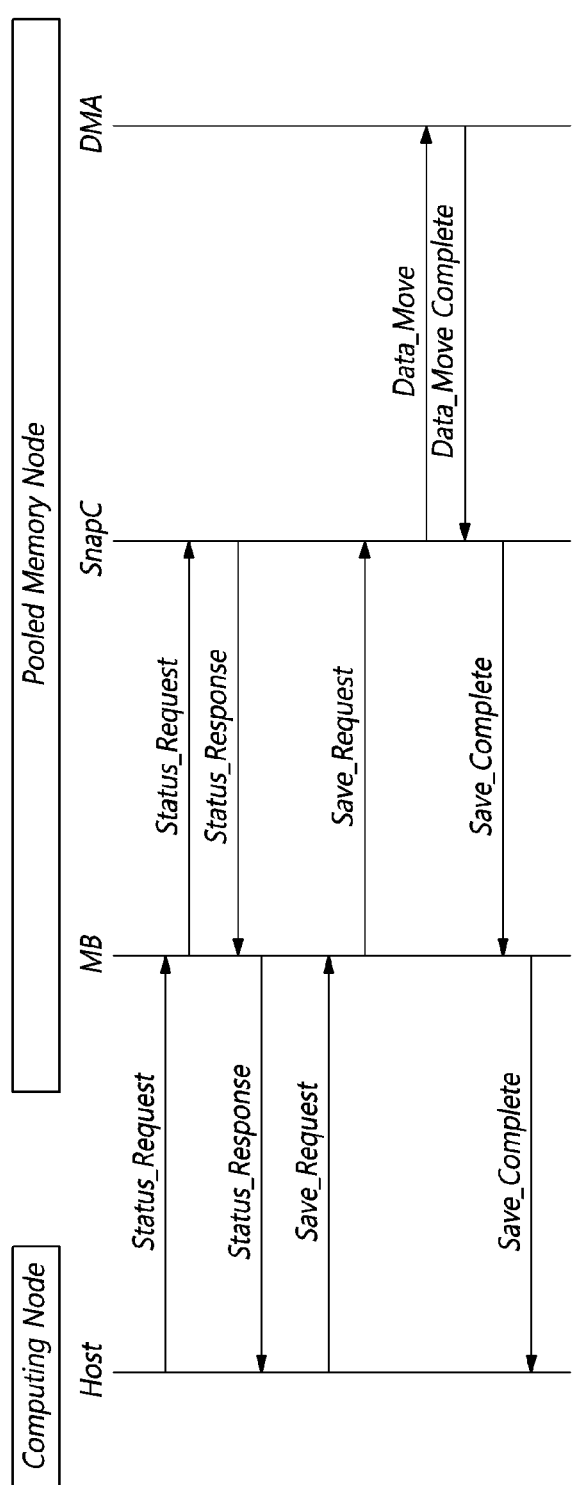
FIG. 10 is a diagram illustrating an example of a snapshot operation that is performed in a computing system based on an embodiment of the disclosed technology.

FIG. 10 is a diagram illustrating an example of a procedure in which a snapshot operation is performed in a computing system based on an embodiment of the disclosed technology.

Referring to FIG. 10, an example of flow of signals or commands according to a snapshot operation is shown.

The host device 210 in which a virtual machine operates may be referred to as a computing node.

The data storage system 400 may provide a memory region to be allocated to the virtual machine and a snapshot operation may be performed in the data storage system 400 according to a snapshot request of the host device 210. In some implementations, the data storage system 400 may be referred to as a pooled memory node. In some implementations, a pooled memory node may include different types of memory devices. In some implementations, the pooled memory node may include the auxiliary memory 150 and the snapshot controller 172 of the data storage device 100 and the data movement management module 183 of the auxiliary storage device 180.

Before transmitting a snapshot request, the host device 210 may transmit a status request which requests the status information of the data storage device 100. The status request may be stored in the auxiliary memory 150 of the data storage device 100.

The snapshot controller 172 may check the status request stored in the auxiliary memory 150. According to the status request, the snapshot controller 172 may check whether it is a status in which a snapshot operation may be performed.

For example, the snapshot controller 172 may check whether the memory device 160, included in the data storage device 100 and including a memory region allocated to a virtual machine related to the snapshot request, is in a status in which a snapshot operation may be performed.

In some implementations, the snapshot controller 172 may check whether it is a status in which a snapshot operation may be performed, by checking the free space of the auxiliary storage memory 184 included in the auxiliary storage device 180, the operating status of the data movement management module 183, etc.

The snapshot controller 172 may store a status response corresponding to the status request in the auxiliary memory 150, and the status response stored in the auxiliary memory 150 may be transmitted to the host device 210.

When it is checked through the status response by the snapshot controller 172 that a snapshot operation may be performed, the host device 210 may transmit a snapshot request (or a storage request) to the memory device 100. The snapshot request may be stored in the auxiliary memory 150.

When checking the snapshot request stored in the auxiliary memory 150, the snapshot controller 172 may transmit a data movement command to the data movement management module 183 of the auxiliary storage device 180.

According to the data movement command of the snapshot controller 172, the data movement management module 183 may store snapshot data of data stored in the memory device 160 in the auxiliary storage memory 184 of the auxiliary storage device 180.

The data movement management module 183 may transmit a movement completion signal to the snapshot controller 172 when storage of the snapshot data is completed.

When receiving the movement completion signal, the snapshot controller 172 may store a storage completion signal (data storage completion signal) in the auxiliary memory 150. The storage completion signal stored in the auxiliary memory 150 may be transmitted to the host device 210.

Through transmission and reception of commands and signals between the host device 210 and the snapshot controller 172 included in the data storage device 100, a snapshot operation for data stored in the data storage device 100 may be easily performed without moving the data between the computing node and the pooled memory node.

The foregoing embodiments are briefly described below.

A data storage system according to embodiments of the disclosure may comprise an auxiliary storage device, and a data storage device including a plurality of memory regions configured to stored data, and configured to: allocate the plurality of memory regions according to a memory allocation request of at least one host device, generate, in response to a snapshot request of the at least one host device, snapshot data corresponding to at least part of the data stored in at least part of the plurality of memory regions allocated to the at least one host device among the plurality of memory regions, and store the snapshot data into the auxiliary storage device.

The data storage device may include at least one memory device, and the at least one memory device is physically separated from the auxiliary storage device.

The data storage device may be configured to suspend transmission of a data transmission request or data reception request by a virtual machine operating in the at least one host device and related to the snapshot request, during a snapshot operation period during which an operation of generating the snapshot data, and store the snapshot data into the auxiliary storage device is performed.

The data storage device may be configured to transmit the data transmission request or the data reception request by a virtual machine other than the virtual machine operating in the at least one host device and related to the snapshot request, during the snapshot operation period.

The data storage device may transmit a data movement command for the snapshot data to a data movement management module included in the auxiliary storage device, and the snapshot data is stored into the auxiliary storage device by the data movement management module.

A computing system according to embodiments of the disclosure may comprise at least one host device, and a data storage device including a plurality of memory regions configured to store data, and configured to: allocate the plurality of memory regions according to a memory allocation request of the at least one host device, and store, into an auxiliary storage device, in response to a snapshot request of the at least one host device, snapshot data corresponding to at least part of the data stored in a memory region of the plurality of memory regions allocated to a first virtual machine operating in the at least one host device among the plurality of memory regions.

The at least one host device may generate, in response to the snapshot request, additional snapshot data for additional data stored in a local memory used by the first virtual machine and being adjacent to the at least one host device, and stores the additional snapshot data in a local storage device that is adjacent to the at least one host device.

The at least one host device may generate the additional snapshot data and store the additional snapshot data into the local storage device, during a period overlapping with at least a portion of a period during which the data storage device generates the snapshot data and stores the snapshot data into the auxiliary storage device.

The at least one host device may generate, in response to the snapshot request, additional snapshot data for additional data stored in a local memory that is used by the first virtual machine and is adjacent to the at least one host device, and request the data storage device to store the additional snapshot data in the memory region allocated to the first virtual machine.

The at least one host device may request the data storage device to store the additional snapshot data, before transmitting the snapshot request to the data storage device.

The data storage device may store the snapshot data and the additional snapshot data into the auxiliary storage device.

The auxiliary storage device may be located outside the data storage device.

The auxiliary storage device may be disposed in the data storage device.

The auxiliary storage device may be located outside the computing system.

During the snapshot operation period, the at least one host device may stop transmitting and receiving data by the memory device and the first virtual machine and transmit and receive data by a second virtual machine operating in the at least one host device.

A data storage system according to embodiments of the disclosure may comprise at least one memory device including a plurality of memory regions, a controller connected to one or more host devices, and configured to control the at least one memory device, and an auxiliary storage device configured to store data generated by the controller, wherein the controller is configured to: allocate the plurality of memory regions in response to a memory allocation request of the one or more host devices, receive a snapshot request from a first host device among the one or more host devices, generate, in response to the snapshot request, snapshot data corresponding to at least part of data stored in at least part of the plurality of memory regions allocated to the first host device among the plurality of memory regions, and store the snapshot data in the auxiliary storage device.

The controller may suspend transmission of a data transmission request or a data reception request by a virtual machine operating in the first host device and related to the snapshot request, during a snapshot period during which the snapshot data is generated and the snapshot data is stored into the auxiliary storage device.

The controller may transmit a data transmission request or a data reception request by a virtual machine other than the virtual machine operating in the first host device and related to the snapshot request, during the snapshot period.

The controller may transmit a data movement command for the snapshot data to a data movement management module included in the auxiliary storage device, wherein the snapshot data is stored into the auxiliary storage device by the data movement management module.

Only a few embodiments and examples are described. Enhancements and variations of the disclosed embodiments and other embodiments can be made based on what is described and illustrated in this patent document.

What is claimed is:

1. A data storage device comprising:
at least one memory device including a plurality of memory regions configured to store data;
a first controller configured to allocate the plurality of memory regions according to a memory allocation request of one or more host devices; and
a second controller configured to: generate, in response to a snapshot request of a first host device among the one or more host devices, snapshot data corresponding to at least part of the data stored in at least part of the plurality of memory regions allocated to the first host device; and store the snapshot data into an auxiliary storage device coupled to the second controller,
wherein the second controller is configured to transmit a data movement command for the snapshot data to a data movement management module included in the auxiliary storage device, wherein the snapshot data is stored into the auxiliary storage device by the data movement management module.

2. The data storage device according to claim 1, wherein the second controller is configured to:
generate, in response to the snapshot request, first snapshot data for data stored in a first memory region allocated to a first virtual machine operating in the first host device, among the memory regions allocated to the first host device; and
store the first snapshot data into the auxiliary storage device.

3. The data storage device according to claim 2, wherein the first controller is configured to suspend transmission of a data transmission request or a data reception request by the first virtual machine during a snapshot operation period during which the second controller generates the first snapshot data and stores the first snapshot data into the auxiliary storage device.

4. The data storage device according to claim 3, wherein the first controller is configured to transmit the data transmission request or the data reception request by a second virtual machine operating in the first host device during the snapshot operation period.

5. The data storage device according to claim 1, wherein the second controller is configured to: receive a movement completion signal from the data movement management module upon storing the snapshot data in the auxiliary storage device; and transmit, in response to the movement completion signal, a data storage completion signal for the snapshot data to the first host device.

6. The data storage device according to claim 1, further comprising:
a data movement management module configured to move the snapshot data to the auxiliary storage device.

7. The data storage device according to claim 6, wherein the second controller transmits, to the data movement management module, a data movement command for the snapshot data to store the snapshot data in the auxiliary storage device.

8. The data storage device according to claim 7, wherein the data movement management module moves the snapshot data to the auxiliary storage device in response to the data movement command.

9. The data storage device according to claim 1, wherein, in response to a backup request from a second host device among the one or more host devices, the second controller stores, into the auxiliary storage device, data stored in at least a part of memory regions allocated to the second host device among the plurality of memory regions.

10. The data storage device according to claim 1, wherein, in response to a rollback request of the first host device, the second controller restores, to the memory regions allocated to the first host device, the snapshot data stored in the auxiliary storage device.

11. The data storage device according to claim 1, wherein the auxiliary storage device is not directly connected to the one or more host devices.

12. The data storage device according to claim 11, wherein the first controller communicates with the one or more host devices through a first interface, and the second controller communicates with the auxiliary storage device through a second interface different from the first interface.

13. The data storage device according to claim 1, wherein the auxiliary storage device is located outside the second controller.

14. The data storage device according to claim 13, wherein the auxiliary storage device is disposed in the data storage device.

15. The data storage device according to claim 13, wherein the auxiliary storage device is located outside the data storage device.

16. A data storage device comprising:
at least one memory device including a plurality of memory regions configured to store data;
a first controller configured to allocate the plurality of memory regions according to a memory allocation request of one or more host devices;
a second controller configured to: generate, in response to a snapshot request of a first host device among the one or more host devices, snapshot data corresponding to at least part of the data stored in at least part of the plurality of memory regions allocated to the first host device; and store the snapshot data into an auxiliary storage device coupled to the second controller; and
an auxiliary memory configured to store the memory allocation request and the snapshot request.

17. A computing system comprising:

at least one host device; and a data storage device including a plurality of memory regions configured to store data, and configured to:

allocate the plurality of memory regions according to a memory allocation request of the at least one host device; and store, into an auxiliary storage device, in response to a snapshot request of the at least one host device, snapshot data corresponding to at least part of the data stored in a memory region of the plurality of memory regions allocated to a first virtual machine operating in the at least one host device among the plurality of memory regions, wherein the data storage device suspends transmission of a data transmission request or a data reception request by the first virtual machine during a snapshot operation period during which the data storage device stores the snapshot data into the auxiliary storage device, wherein the data storage device transmits the data transmission request or the data reception request by a second virtual machine operating in the at least one host device during the snapshot operation period.

\* \* \* \* \*